United States Patent [19]

Domangue

[11] Patent Number: 5,201,491
[45] Date of Patent: Apr. 13, 1993

[54] ADJUSTABLE WELL CHOKE MECHANISM

[75] Inventor: Kenneth J. Domangue, Houma, La.

[73] Assignee: Texaco Inc., White Plains, N.Y.

[21] Appl. No.: 838,986

[22] Filed: Feb. 21, 1992

[51] Int. Cl.$^5$ .............................................. F16K 1/38
[52] U.S. Cl. .................................... 251/122; 251/903;
251/363; 166/91; 166/97
[58] Field of Search ...................... 251/122, 363, 903;
166/91, 97

[56] References Cited

U.S. PATENT DOCUMENTS

| | | | |
|---|---|---|---|
| 4,413,646 | 11/1983 | Platt et al. ...................... | 251/122 X |
| 4,493,336 | 1/1985 | Renfro ............................. | 251/122 X |
| 4,732,364 | 3/1988 | Seger et al. ..................... | 251/122 X |
| 4,735,229 | 4/1988 | Lancaster ........................ | 251/122 X |

Primary Examiner—Arnold Rosenthal
Attorney, Agent, or Firm—James J. O'Loughlin; Robert B. Burns

[57] ABSTRACT

Apparatus for regulating the fluid flow produced from a gas pressurized subterranean reservoir. The produced mixture comprising crude oil, water, gas and varying amounts of particulated matter. The apparatus includes a bean which is characterized by a constant diameter flow passage, which limits the flow to a maximum rate. An adjustable valve positioned immediately upstream of the bean flow passage is adjustable to regulate the flow of pressurized fluid from its source, to a desired value less than the maximum level maintained by the bean. The apparatus is structured to allow ready access to the interior to facilitate replacement and repair of internal parts which may become worn or damaged due to constant wear and erosion by the flowing, abrasive fluid.

5 Claims, 2 Drawing Sheets

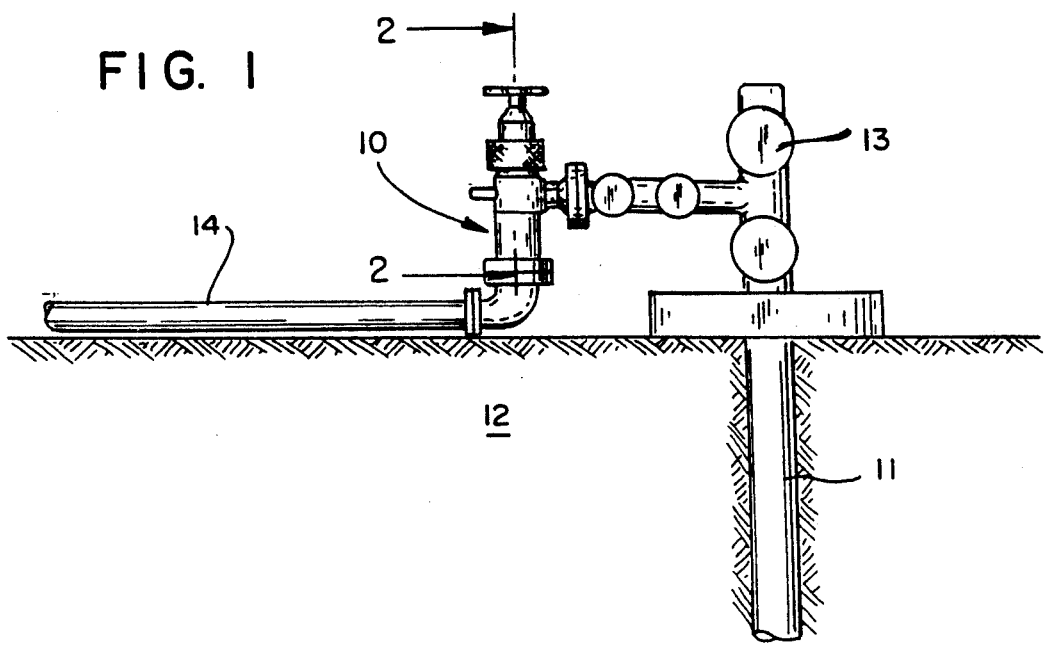
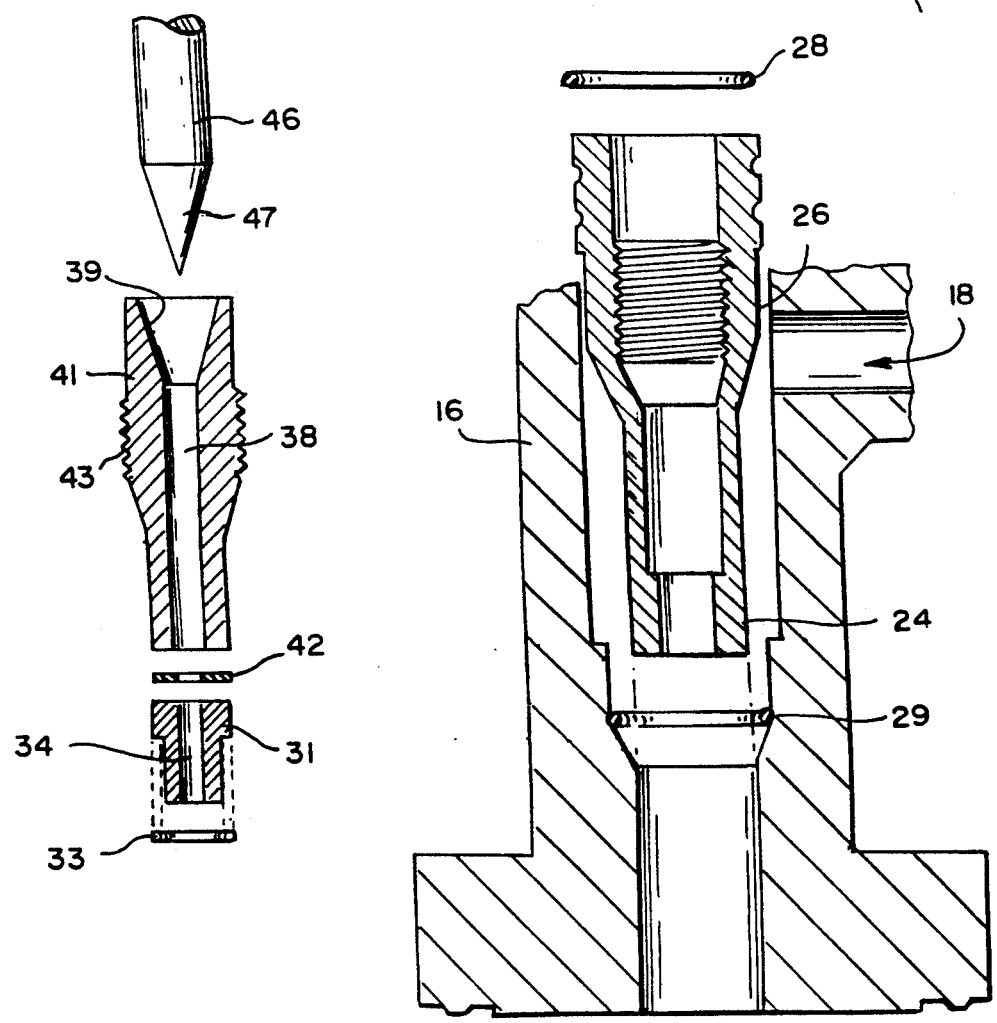

5,201,491

ADJUSTABLE WELL CHOKE MECHANISM

BACKGROUND OF THE INVENTION

In the production of hydrocarbon fluids from a subterranean reservoir through a well riser the flow, or volume of product will be effected by gas pressure at the reservoir. This pressure can vary depending on the particular location of, and on the age of the reservoir. Normally, the actuating pressure on the fluids contained in the reservoir will decrease over a period of time. Eventually it will decline to a level which is insufficient to move the fluid to the surface where it can be produced through a flow control system.

When the well produces under normal, controlled conditions, the reservoir pressure will be adequate to urge the fluid upwardly through the conductor or riser so long as the flow is regulated. The produced fluid will generally be comprised of a mixture of crude oil, pressurizing gas, and a varying quantity of water. There will also be present an amount of particulated elements such as sand, and other solids which determine the composition of the reservoir.

In view of this mixture's abrasive quality, and the high pressure and velocity at which the fluid is produced, the sand particles will have a detrimental scouring effect. The surfaces along which the mixture passes will become scored, abraded and will eventually require replacement.

It is desirable and even mandatory that the flow of fluid from an underground reservoir be regulated and closely controlled by a choke or the like. This will permit the flow rate to be accurately measured. Secondly, without such protection, a dangerous or uncontrollable condition might develop due to excessive pressure or free flow of the fluid from the well.

Maintaining the efficiency and the accuracy of any controlled well of this type is usually achieved by choking the flow. It has been experienced, that periodically either the bean which maintains the flow below a maximum level, or an adjustable valve which is regulated to provide a desired rate of flow, will have to be replaced.

In most well control systems, either a bean or a valve can be used to achieve this function. In the present arrangement, choking the flow rate to a desired level is achieved by positioning the bean, as well as a flow regulating valve, in close sequential proximity. Thus, as the bean receives a controlled flow of the produced fluid from a well, the flow will be properly regulated. Further, either of the flow controlling elements i.e., the bean and/or the valve parts, can be replaced without closing down fluid production for an extended period of time.

This is achieved in the disclosed apparatus by providing a variable flow control choke in the form of an elongated body having an inlet port at one end to receive a stream of the produced fluid. A discharge port at the body other end passes the fluid into a receiving conductor or the like.

The valve body is formed with a longitudinal cavity. A sleeve removably positioned in the cavity is maintained in place to form both a sealed arrangement with the cavity and to define a central passage in which both a bean and a valve member can be received.

The bean is positioned at the downstream end of the sleeve, and held in place by a seating collar. A valve stem, comprised primarily of a tapered seat, engages the seating collar. Thus, rotation of the valve stem will cause the latter to be adjusted longitudinally through the seating collar to regulate fluid flow which enters the bean main flow passage.

DESCRIPTION OF THE DRAWINGS

Referring to the drawings,

FIG. 1 is a view of a subterranean well with a surface connection to regulate fluid flow.

FIG. 3 is an exploded, segmentary view in cross section of a segment of the apparatus.

DESCRIPTION OF THE INVENTION

Figure 2:
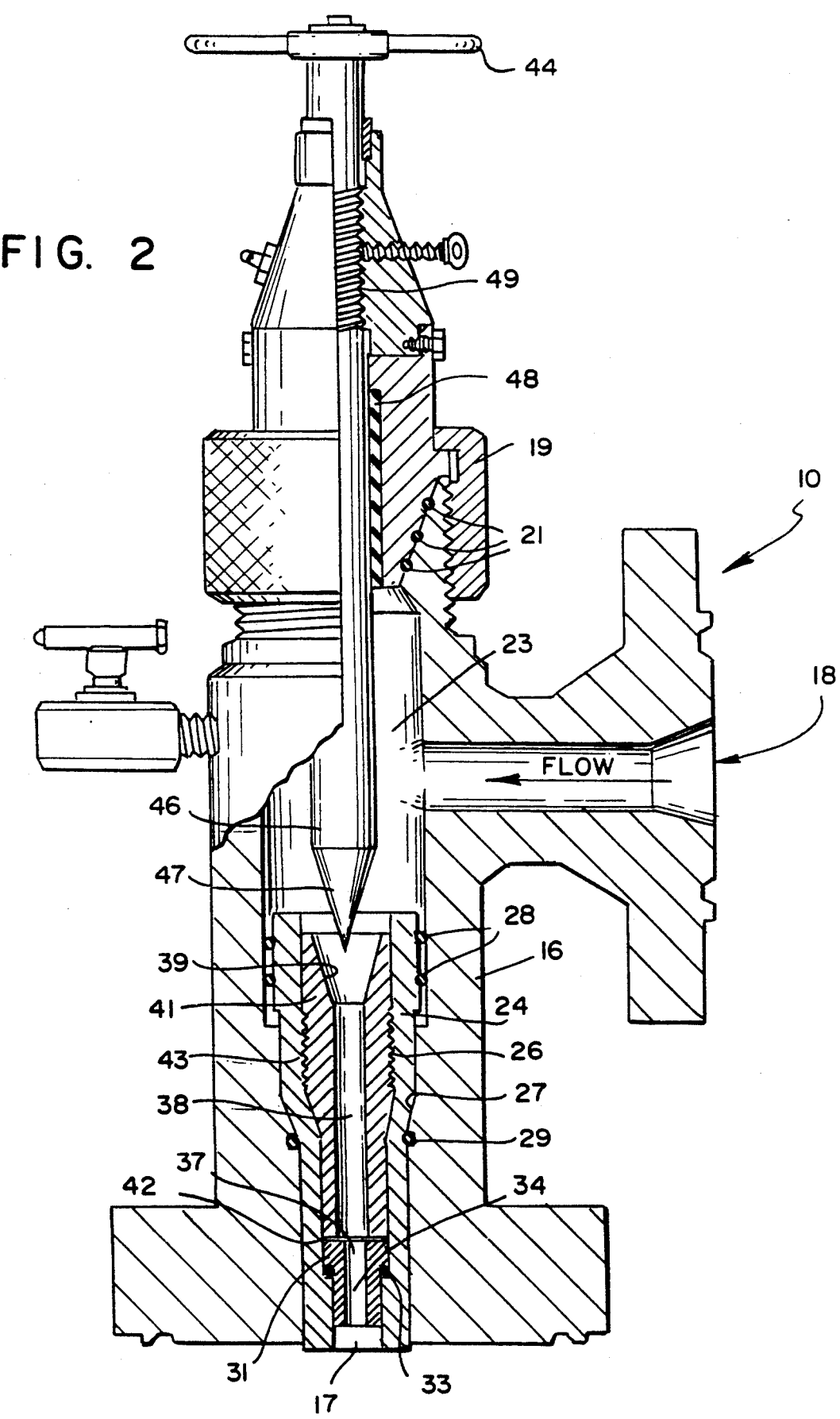
FIG. 2 is a cross-sectional representation of the present apparatus taken along line 2—2 in FIG. 1

Referring to FIG. 1, the variable or adjustable choke, or flow control apparatus 10 is shown engaging the upstream end of a riser 11 which forms a segment of a well in the earth, which terminates in a crude oil containing reservoir 12. Riser 11 is normally provided with one or more down hole openings or perforations such that reservoir gas acting against the crude oil and the water contained in the reservoir, will drive the mixture upward through the riser and into the well head control member 13 Flow from said control member is directed to a flow or pipe line 14.

The well head is provided with a flange to receive choke 10, either by bolting or by another connecting arrangement, thereby communicating the pressurized fluid flow with a choke inlet port 18.

Referring to FIG. 2, the novel adjustable choke 10 is comprised primarily of an elongated body 16 having a discharge port 17 for fluid passing therefrom. Inlet port 18 at the body upstream end receives the produced fluid mixture leaving well head 13.

Body 16 is generally elongated, having an internal longitudinal cavity which communicates fluid inlet port 18 with the fluid outlet port 17 The upstream end of body 16 is provided with a closure cap 19 which threadably engages the body to compress sealing rings 21, thereby assuring a fluid tight annular joint.

The body 16 internal longitudinal cavity is formed by a plurality of cylindrical segments commencing with the smallest diameter at discharge end 17. Progressively larger diameter segments terminate at inlet chamber 23 adjacent to the fluid inlet port 18.

An elongated sleeve 24 is received in the longitudinal cavity, being slidably registered in the smaller or constricted discharge port 17 and including a central threaded portion 26. Sleeve 24 is longitudinally positioned within the internal cavity by engagement of a conical shoulder 27, which engages a corresponding shoulder on the cavity inner wall.

The fluid tight integrity of sleeve 24 in body 16 is assured by one or more flexible seal rings 28 and 29, deformed against the elongated cavity peripheral walls. When sleeve 24 is registered into the longitudinal cavity, the compressed seal rings will obviate passage of pressurized fluid through this annular joint.

A cylindrical segment of sleeve 24 is formed to slideably accommodate a bean 31 having a shoulder which compressively engages a flexible washer 33, which is compressed against an annular shoulder of sleeve 24.

Structurally, bean 31 is provided with an internal flow passage or axial channel 34 of constant diameter, having an inlet 37 at the upstream end. Said constant diameter is such that functionally it will limit the flow of produced fluid to a maximum rate regardless of fluid pressure at the bean upstream end.

A seating collar or calibrated flow bean 41 having a threaded external segment is removably positioned in sleeve 24 such that the downstream face engages a washer 42 which in turn bears against the upstream surface of bean 31. When fully registered, seating collar 41 will bear tightly against bean 31, such that said members define a rigid connection and a continuous flow passage there through. The peripheral wall of seating collar 41 is provided with at least one peripheral seal ring 43 to assure blocking of fluid from inlet chamber 23.

Seating collar 41 is comprised of cylindrical central bore 38 which terminates at its downstream end at flow channel or passage 34. The latter is aligned co-axially with bean 41 to allow fluid flow to enter passage 34 after it has been initially throttled by horizontal adjustment of valve stem 46.

The flow adjusting valve section of the choke is comprised primarily of valve stem 46 having a conical seat 47 which conforms with the tapered or conical wall 39 in seating collar 41 Stem 46 is longitudinally positioned within the seating collar 41 by a threaded segment which engages a corresponding threaded segment valve body 16. Thus, rotation of valve stem 46 by handle 44 will move the said member longitudinally through the seating collar 41 to achieve a desired fluid flow rate as the conical or tapered or annular wall passage defined between bean seat 39 and stem seat 47, becomes more constricted.

The main shank of valve stem 46 registers in the cylindrical portion of the body 16 to define a constant, annual cross-sectional opening. As noted, rotational adjustment between the fixed conical seat 39, and the conical stem seat 47, alters the tapered annual opening there between to adjust or choke the flow of produced fluid through the valve prior to said flow entering flow control channel 34 of bean 31.

Valve stem 46 is sealably positioned within the body 16 by a ring 48 carried in the body or on stem 46, which avoids fluid leakage.

It is understood that although modifications and variations of the invention can be made without departing from the spirit and scope thereof, only such limitations should be imposed as are indicated in the appended claims.

We claim:

1. Adjustable choke for regulating fluid flow from the well conductor producing a pressurized fluid mixture comprising crude oil, gas and water, together with particulated solids, which choke includes an elongated body (16) having a fluid discharge port (17) downstream end spaced longitudinally from an inlet port (18)

means forming a longitudinal cavity through said elongated body communicating said inlet port (18) with said discharge port (17) and a sleeve (24) removably positioned in said longitudinal cavity a fluid flow limiting bean (31) removably positioned at the downstream end of said sleeve (24), having uniform diameter axial flow passage (34) which opens into said discharge port (17)

a flow adjusting valve means (in said) cooperative with said sleeve, having a seat segment (39) which (opens into) communicates with said uniform diameter axial flow passage (34)

said flow adjusting valve means including a valve stem (46) operably positioned in said body (16) to define with said seat segment (39), an adjustable, tapered wall flow channel through said seat segment (39).

2. In the apparatus as defined in claim 1 wherein said flow adjusting valve includes:

a seating collar removably positioned in said means forming said cavity and having a seat segment at the upstream end thereof and an axial chamber downstream thereof.

3. In the apparatus as defined in claim 2 wherein said seating collar is threadably received in said means forming said sleeve.

4. In the apparatus as defined in claim 3 wherein said seating collar includes at least one resilient seal ring compressed into sealing engagement with said body.

5. In the apparatus as defined in claim 1 including a washer positioned in said cavity between said bean and said seating collar.

* * * * *